UNITED STATES PATENT OFFICE.

SAMUEL CLELAND DAVIDSON, OF BELFAST, IRELAND.

PROCESS OF CLARIFYING COFFEE OR COCOA.

SPECIFICATION forming part of Letters Patent No. 352,808, dated November 16, 1886.

Application filed February 25, 1886. Serial No. 193,210. (No specimens.)

*To all whom it may concern:*

Be it known that I, SAMUEL CLELAND DAVIDSON, of Belfast, Ireland, have invented certain new and useful Improvements in the Clarification of Aqueous Infusions or Decoctions of Coffee or Cocoa, of which the following is a specification.

Ordinary aqueous infusions or decoctions of coffee and cocoa have a dull and turbid appearance, which, especially in the cocoa, intensifies as it becomes cold, and it is almost impracticable to accomplish the removal of this turbidity by any ordinary filtration, and the infusions or decoctions when in this turbid condition are very prone to decomposition.

My improvements consist in the clarification of these infusions and decoctions by so treating them that the matter causing their turbidity is precipitated and rendered easily removable by filtration or decantation, the flavor and other characteristics of the infusions or decoctions being almost unaffected by the process. The resulting liquors are brilliantly transparent and possess even a richer color than in their original condition, and are capable of being kept a long time if bottled and securely corked so as to exclude the air.

My improvements are carried out as follows: I make an infusion or decoction of coffee or cocoa with boiling water, of preferably three or four times the strength that such are ordinarily used as beverages, and for convenience of operation I strain off the liquor from the grounds. The strained liquor is usually more or less dull and turbid in appearance and shows a slightly acid reaction to test-paper. I then add to it an alkali or alkaline substance in sufficient quantity to render the liquor slightly alkaline to test-paper, and the result of this treatment is that the matter causing the turbid appearance of the liquor will soon form into a flocculent precipitate, which will gradually settle to the bottom, leaving the liquor above it quite free from turbidity and rather richer in color than before this treatment. The effect is produced by the alkali whether the liquor be hot or cold when it is added. The precipitated matter may then be removed either by decantation or by any convenient method of filtration, such as straining through cloth filter-bags, and when the liquors are freed from this precipitate their treatment is completed and the object of my herein-described improvements for their clarification effected. The alkaline substance which I preferably use is borax; but the hydrates and carbonate of soda and potash can also be used, but their preservative action is not so good as that of borax, though they precipitate the turbid matter similarly, and ammonia alkalies likewise do so, but the smell and flavor which they impart to the liquors are objectionable.

The amount of borax requisite to produce the alkaline reaction above referred to is usually about one and one-half grain per fluid ounce of infusion, when the same is prepared to the strength hereinbefore recommended, and if the infusion be hot when so treated the precipitate will very rapidly form, but if it be cold the action will be slower, but will nevertheless take place.

The water best suited for making the above infusions or decoctions is what is known as "soft water,"—that is, water free from the "hardness" of sulphate of lime in solution, and it must also be free from alkaline-carbonates or salts in solution, and if any such be present the same should be neutralized by adding sufficient vegetable acid to neutralize the alkali before adding the coffee or cocoa to the water to make the infusion or decoction.

If the infusions or decoctions be required sweet, sugar may be added to the clarified liquors to any required degree, and in either the sweetened or unsweetened state the liquors may be charged with carbonic acid or mixed with carbonated water and bottled as aerated beverages are, as such have the refreshing and stimulating effects of coffee and cocoa in a highly agreeable form.

I am aware of the general use of alkali for neutralizing acidity, and that alkali has been used as a preservative, and I am also aware that borax has long been known as a preservative for milk, meat, fish, &c., but so far as I am aware neither alkalies generally nor borax in particular have ever been used for effecting the clarification of the substances with which they are mixed—for example, the effect of borax on milk has never been to clarify it. I make no claim to the use of alkalies generally nor of borax in particular as preservatives, nor for their use in neutralizing acidity.

I am aware that alum and borax have been used conjointly to purify river water, but when so used the impurities of the water are precipitated, not by the borax, but by the action of the alum, and this action of the alum takes place if the alum be used alone and without the borax; whereas if the borax be used alone it does not clarify the water, and its employment along with the alum is not for the purpose of clarifying the water, but merely to soften the acrid taste of the alum in the water. I do not, however, use alum at all, as its action in coffee and cocoa infusions is to render them much more turbid, and my employment of borax as a clarifying agent for coffee and cocoa infusions differs essentially from its employment conjointly with alum in reference to river-water, as above described, as its action therein is not as a clarifying medium.

I am also aware that ground cocoa beans have been treated with soda or potash to render the powder more soluble, but such treatment is entirely antagonistic to my invention, because the use or presence of an alkali in making the decoction completely prevents the precipitating action of my alkali treatment, which requires that the coffee and cocoa, and even the water used in making the infusion or decoction, be absolutely free of any alkaline salts, and that the natural acidity of the decoctions be maintained up to the time the alkali is added to precipitate the turbid matter; otherwise the precipitating action of my alkali treatment will not take place.

What I claim, and desire to secure by Letters Patent, is—

The herein-described method of clarifying aqueous infusions or decoctions of coffee or cocoa, which consists in effecting a precipitation of the matter that causes the turbidity of said infusions or decoctions by adding to them borax or other alkali until a faintly alkaline reaction is produced, and in then removing the precipitated matter by filtration or decantation, whereby the liquor is left brilliantly clarified, substantially as set forth.

In witness whereof I have hereunto signed my name in the presence of two subscribing witnesses.

SAMUEL CLELAND DAVIDSON.

Witnesses:
    FRANCIS A. MAITLAND,
        *Librarian, Linen Hall, Belfast.*
    CHARLES W___,
        *Porter, Linen Hall, Belfast.*